Jan. 27, 1931.  M. B. AMACHER  1,790,194
COOKING UTENSIL
Filed July 6, 1929
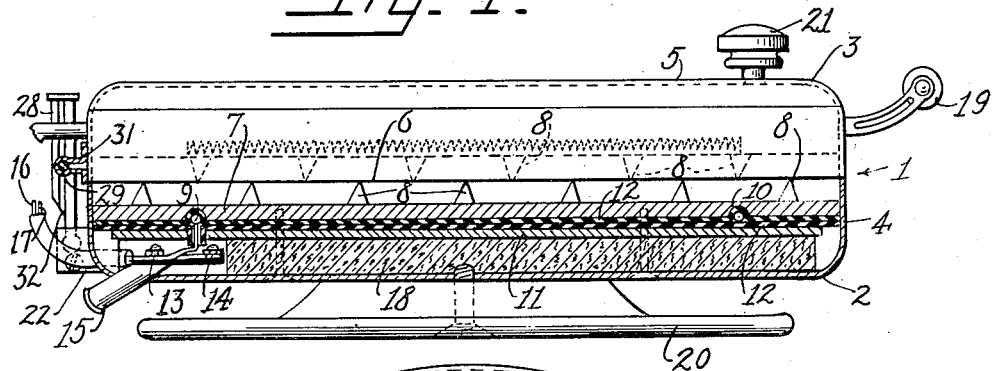
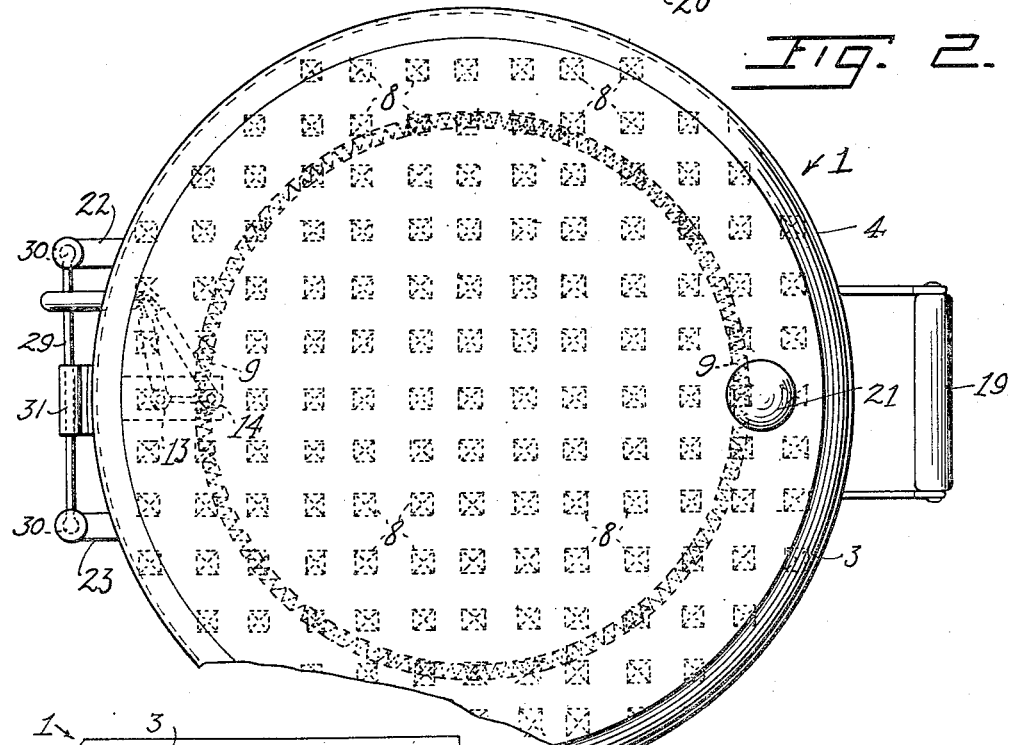
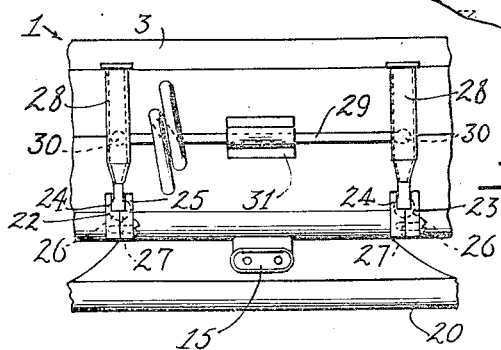
INVENTOR.
M. B. AMACHER.
BY Munn & Co.
ATTORNEYS.

Patented Jan. 27, 1931

1,790,194

UNITED STATES PATENT OFFICE

MINNIE B. AMACHER, OF ABERDEEN, WASHINGTON

COOKING UTENSIL

Application filed July 6, 1929. Serial No. 376,471.

The present invention relates to improvements in cooking utensils and has particular reference to an electric meat iron—that is, a utensil adapted to be used for cooking, broiling or roasting meat, particularly steaks and roasts.

My cooking utensil works somewhat on the principle of the waffle iron, but differs from the same in general structural features as well as in the particular shape of the face plates coming in contact with the meat.

One important feature of my invention is to provide the face plates coming in contact with the meat with a series of projecting teeth which penetrate into the meat and sear the meat, preventing the juices from running out, whereby the richness and the flavor of the meat are enhanced.

It is a further object of my invention to provide an electric meat iron in which two co-acting heating members engaging a slice of meat from opposite sides are hinged together in such a manner that they will readily adjust themselves to slices of meat of different thicknesses.

Further objects and advantages of my invention will appear as the specification proceeds.

The preferred form of my invention is illustrated in the accompanying drawing, in which Figure 1 shows a side elevation of my electric meat iron, a portion of the same being shown in section;

Figure 2, a top plan view of the same, and

Figure 3, a fragmentary end elevation showing the means for hinging the two sections of the iron together.

While I have shown only the preferred form of my invention, I wish to have it understood that various changes or modifications may be made within the scope of the claims hereto attached without departing from the spirit of the invention.

In its preferred form, my electric meat iron 1 comprises a lower section 2 and an upper section 3. both sections being preferably circular in form, of suitable size and made in such a manner that when the upper section is placed on top of the lower section, a slice of meat may be confined between the two sections.

A cylindrical housing 4 closed at one end, as shown at 5, and open at the other end, as at 6, is provided for each section.

Each of the sections has a plate 7 supported therein in spaced relation to the open end, the spacing preferably corresponding to one-half of the thickness of an ordinary steak, so that when the two sections are placed together in the manner shown in Figure 1, with a steak interposed between the two sections, the latter will contact the plates. Each of the plates has a number of teeth 8 extending therefrom in such a manner that the teeth penetrate into the meat to a certain depth. The teeth are preferably pyramidal in shape and the teeth of one section are preferably arranged so as not to register with the teeth of the other section. The teeth of one section, for instance, may be arranged to occupy the intersections of a plurality of straight lines drawn across the plate in intersecting relation, so as to form a plurality of squares, while the teeth of the other section may be arranged to occupy the centers of the squares.

Arranged below or above the plate 7, as the case may be, is an electric heating element 9 preferably arranged in a groove 10 in the plate and made in the form of an annular coil. the heating element being insulated from the plate 7 and a second plate 11 by means of two sheets of mica 12 in a conventional manner. The coil of the lower section connects through binding posts 13 and 14 with the socket 15, and the upper heating element connects with the same binding posts through wires 16 and 17. The plate 11 in each section is separated from the closed end thereof by a heavy layer of insulating material, shown at 18. A suitable handle 19 is provided for the upper section and a suitable base 20 for the lower section.

The upper section may also be provided with a rest 21 for spacing the same from the supporting table when the upper section is opened.

The upper section is hinged to the lower section in such a manner that the two sections may adjust themselves to the thickness of the slice of meat interposed. The lower section has two lugs 22 and 23 extending therefrom, each made of two sections 24 and 25 forming between the same a socket 26 for balls 27 at the ends of two posts 28, in which is slidably mounted a cross member 29 by means of balls 30 riding within the posts. The cross member 29 serves as a hinge pin for a hinge 31 extending from the upper section so that when the upper section is raised, by means of the handle 19, the post 28 will swing away from the lower section on their ball hinges, while on closing the upper section upon an interposed slice of meat, it may raise or lower itself by the cross member 29 sliding in the posts 28. It will be noted that in case it is desired to remove the upper section from the lower section altogether, an exit is provided for the cross member 29, as shown at 32.

The manner of using my device will be readily understood from the foregoing description.

A slice of meat is cut to a suitable size and placed on top of the lower plate 7, whereupon the upper plate is brought down upon the lower plate. The heating elements are turned on to provide proper heat at the proper time in accordance with the best rules used in cooking.

The meat confined between the two plates will have its surfaces and those parts coming in contact with the teeth 8 seared, whereby the juice is prevented from flowing out of the meat, so that all the juice is retained and the steak thus produced is exceedingly well-tasting and palatable.

I claim:

1. An electric meat iron of the character described, comprising two complementary sections adapted to receive a slice of meat between the same, means for heating the sections and a hinged connection between the sections comprising a pair of lugs extending from one section having a pair of posts pivoted therein, a cross member slidable on the posts and a member extending from the other section hinged to the cross member.

2. An electric meat iron of the character described, comprising two complementary sections adapted to receive a slice of meat between the same, means for heating the sections and a hinged connection between the sections comprising a pair of lugs extending from one section having a pair of tubular posts pivoted therein with slots formed in the confronting faces of the posts, a crossrod having terminal balls adapted to ride in the posts for raising and lowering the rod and a member extending from the other section hinged to the cross-rod, the posts being formed intermediate their lengths to permit of insertion and removal of the rod.

3. A cooking utensil comprising two sections, guide members pivotally connected to one of the sections, and a hinge slidable in the guide members and being secured to the other section.

4. A cooking utensil comprising two sections, guide members pivotally connected to one of the sections, and a hinge slidable in the guide members and being secured to the other section, said guide members being open at one of their ends for permitting the removal of the hinge therefrom.

MINNIE B. AMACHER.